(12) United States Patent
Bryant (10) Patent No.: US 11,234,557 B2
(45) Date of Patent: Feb. 1, 2022

(54) STOVETOP COOKING AND GRILLING ASSEMBLY

(71) Applicant: Ashley Bryant, Garland, TX (US)

(72) Inventor: Ashley Bryant, Garland, TX (US)

(*) Notice: Subject to any disclaimer, the term of this patent is extended or adjusted under 35 U.S.C. 154(b) by 912 days.

(21) Appl. No.: 15/920,513

(22) Filed: Mar. 14, 2018

(65) Prior Publication Data

US 2019/0282030 A1 Sep. 19, 2019

(51) Int. Cl.
*A47J 37/07* (2006.01)
*F24C 3/08* (2006.01)

(52) U.S. Cl.
CPC ........... *A47J 37/0713* (2013.01); *F24C 3/082* (2013.01)

(58) Field of Classification Search
CPC ................................ F24C 15/14; F24C 15/107
See application file for complete search history.

(56) References Cited

U.S. PATENT DOCUMENTS

| | | | | |
|---|---|---|---|---|
| 2,160,765 A * | 5/1939 | Taylor | ...................... | F24C 3/124 126/214 R |
| 2,161,196 A * | 6/1939 | Prosser | .................... | F24C 15/32 126/39 C |
| 2,560,959 A * | 7/1951 | Klein | ...................... | F24C 15/14 126/39 B |
| 2,790,434 A * | 4/1957 | Del Francia | ........ | A47J 37/0682 126/41 R |
| 3,444,805 A * | 5/1969 | Mitter | ................. | A47J 37/0676 99/340 |
| 3,745,912 A * | 7/1973 | Field | .................... | A47J 37/0676 99/446 |
| 3,954,427 A * | 5/1976 | Jenn | ........................ | B01D 46/10 96/407 |
| 4,517,886 A * | 5/1985 | Bales | ...................... | F24C 15/14 126/41 R |
| 4,862,795 A * | 9/1989 | Hawkins | ............. | A47J 37/0709 99/446 |
| 4,976,252 A | 12/1990 | Cianciola | | |
| 5,682,811 A | 11/1997 | Kidushim | | |
| 5,713,265 A * | 2/1998 | Strader | ................. | A47J 37/067 126/41 R |
| 6,098,613 A * | 8/2000 | Wiersma | ................ | F24C 15/32 126/19 R |
| 6,325,619 B2 | 12/2001 | Dane | | |
| 6,782,801 B1 | 8/2004 | Correa | | |

(Continued)

FOREIGN PATENT DOCUMENTS

EP 2226560 12/2009

*Primary Examiner* — Avinash A Savani
*Assistant Examiner* — Deepak A Deean (57) ABSTRACT

A stovetop cooking and grilling assembly for selective use with a stovetop includes a first housing that is configured as an oven. A second housing is coupled to and extends from an upper end of the first housing. A plurality of burners, which is gas-fired, is coupled to a top of the second housing. Each of a plurality of first grates is selectively couplable to a set of the burners. The set of the burners is configured to grill a food item that is positioned on the first grate. Each of a plurality of slots that is positioned through a front of the second housing is positioned for insertion of a respective tray. A plurality of orifices that is positioned through the top of the second housing is configured to permit drippings from the food item to flow into the second housing to be collected by the tray.

17 Claims, 5 Drawing Sheets

(56) References Cited

U.S. PATENT DOCUMENTS

| | | | |
|---|---|---|---|
| 8,490,614 B1* | 7/2013 | Gregory | A47J 37/0754 |
| | | | 126/41 R |
| 8,899,972 B2 | 12/2014 | Fowler | |
| 2002/0096169 A1* | 7/2002 | Gabelmann | F24C 15/10 |
| | | | 126/39 R |
| 2006/0144253 A1* | 7/2006 | Czajka | F24C 15/14 |
| | | | 99/446 |
| 2012/0012098 A1* | 1/2012 | Berr | F24C 15/107 |
| | | | 126/39 B |
| 2013/0206128 A1* | 8/2013 | Sovar | F24C 3/126 |
| | | | 126/42 |
| 2019/0331337 A1* | 10/2019 | Rasi | F23D 14/06 |

* cited by examiner

STOVETOP COOKING AND GRILLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to grilling assemblies and more particularly pertains to a new grilling assembly for selective use with a stovetop.

BRIEF SUMMARY OF THE INVENTION

An embodiment of the disclosure meets the needs presented above by generally comprising a first housing that is configured as an oven. A second housing is coupled to and extends from an upper end of the first housing. A plurality of burners, which is gas-fired, is coupled to a top of the second housing. Each of a plurality of first grates is selectively couplable to a set of the burners. A plurality of slots is positioned through a front of the second housing. Each of a plurality of trays is selectively insertable through a respective slot into the second housing. The set of the burners is configured to grill a food item that is positioned on the first grate. A plurality of orifices that is positioned through the top of the second housing is configured to permit drippings from the food item to flow into the second housing to be collected by the tray.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new grilling assembly embodying the principles and concepts of an embodiment of the disclosure and generally designated by the reference numeral 10 will be described.

As best illustrated in FIGS. 1 through 5, the stovetop cooking and grilling assembly 10 generally comprises a first housing 12 that is configured as an oven 14. A second housing 16 that defines an interior space 18 is coupled to and extends from an upper end 20 of the first housing 12.

Figure 1:
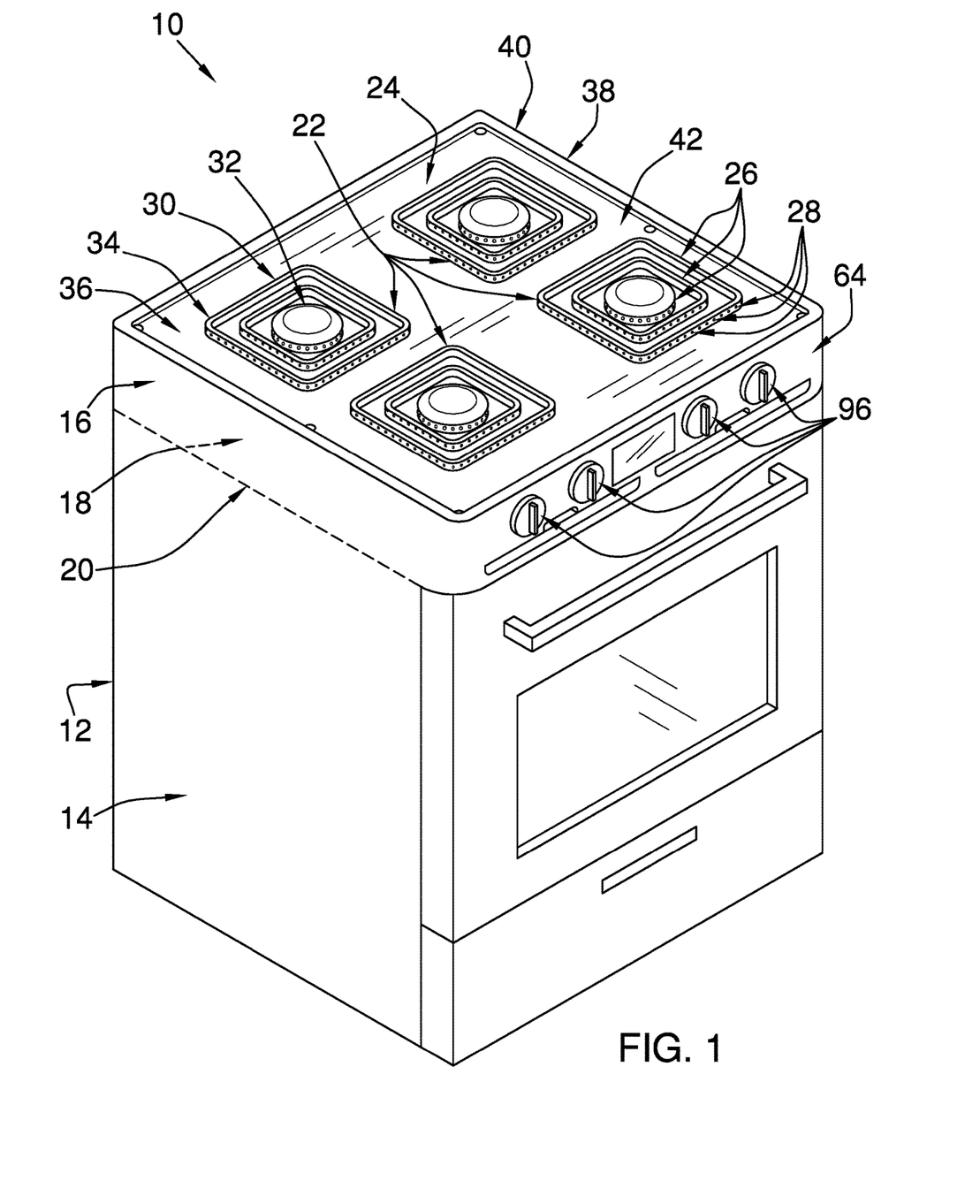
FIG. 1 is an isometric perspective view of a stovetop cooking and grilling assembly according to an embodiment of the disclosure.

A plurality of burners 22 is coupled to a top 24 of the second housing 16, as shown in FIG. 1. The burners 22 are gas-fired. The plurality of burners 22 comprises four burners 22. Each burner 22 comprises a plurality of rings 26. The rings 26 are tubular. The rings 26 are selectively fluidically couplable to a gas source. Each ring 26 is perforated to define a set of holes 28 that is positioned in the ring 26. The set of holes 28 is configured to release a gas from the gas source to an area proximate to the ring 26. The plurality of rings 26 comprises an outer ring 30, an inner ring 32, and a medial ring 34 that is positioned between the outer ring 30 and the inner ring 32. The outer ring 30 and the medial ring 34 are substantially squarely shaped, while the inner ring 32 is circularly shaped, as shown in FIG. 2.

Figure 2:
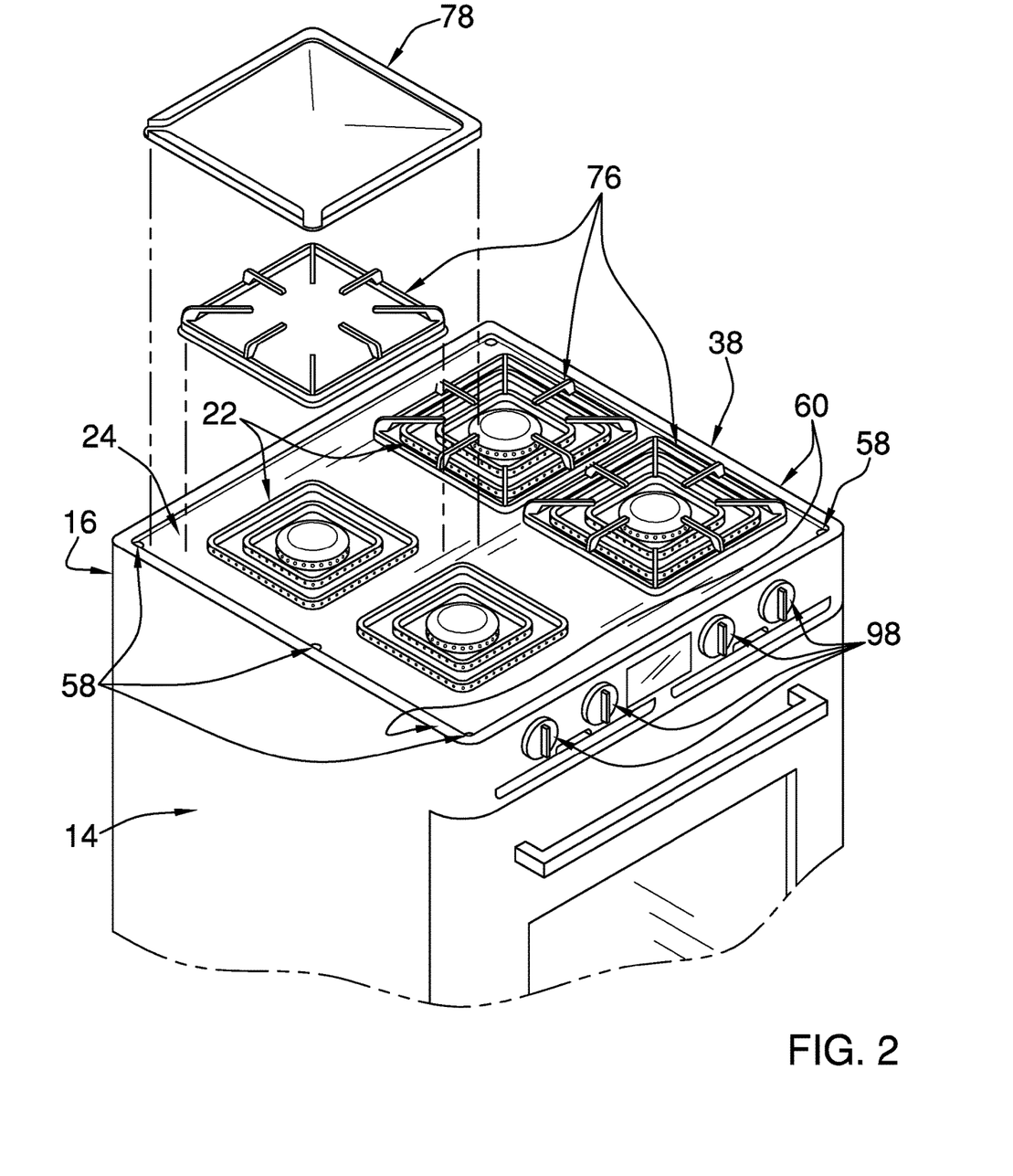
FIG. 2 is an isometric perspective view of an embodiment of the disclosure.

A recess 36 is positioned in the top 24 and defines a rim 38 that extends around a circumference 40 of the top 24, as shown in FIG. 2. The rim 38 defines a containment area 42 on the top 24 of the second housing 16.

Figure 3:
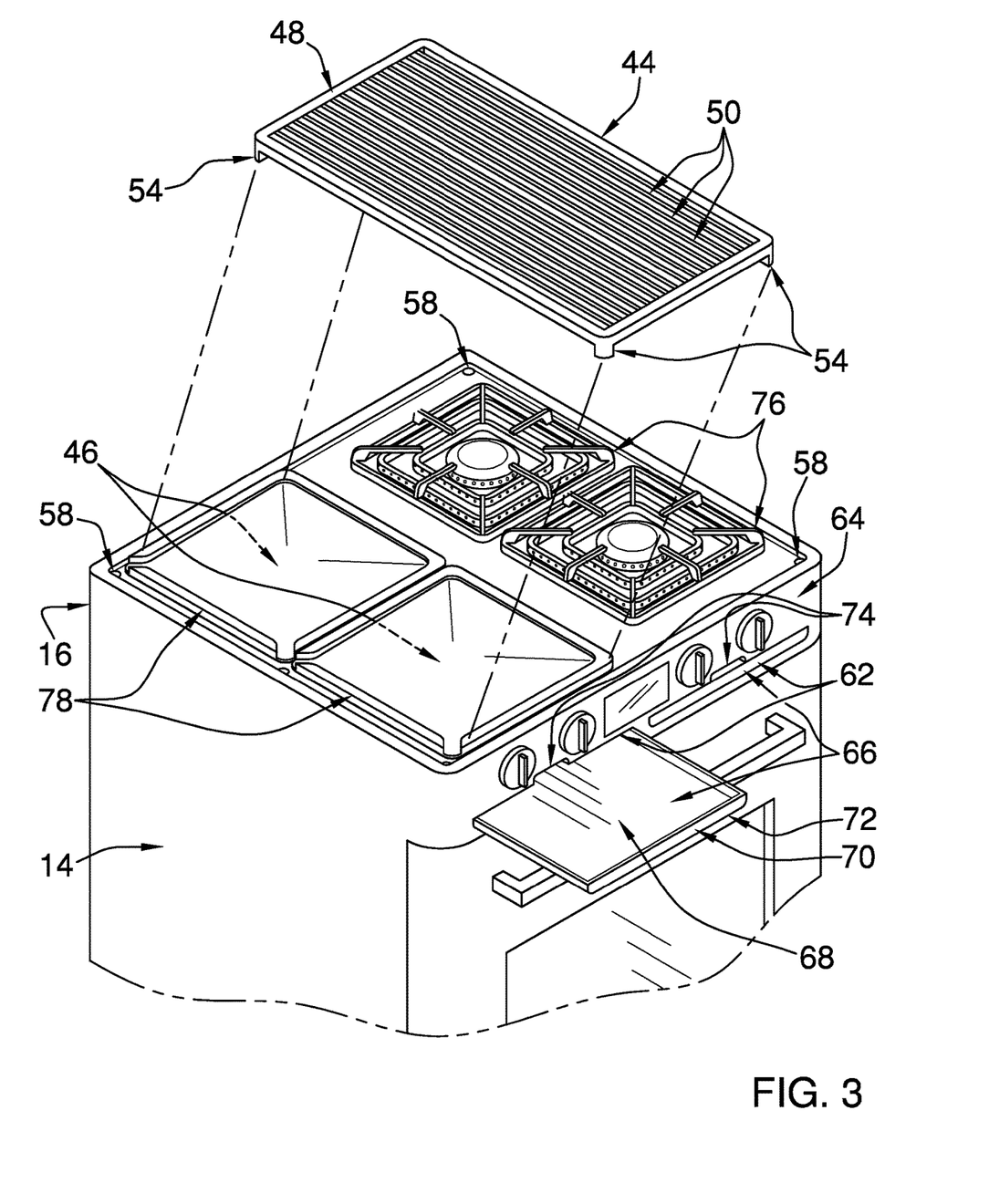
FIG. 3 is an isometric perspective view of an embodiment of the disclosure.

Each of a plurality of first grates 44 is selectively couplable to a set of burners 46. The set of burners 46 is configured to grill a food item that is positioned on the first grate 44. Each first grate 44 comprises a frame 48 that is rectangularly shaped, as shown in FIG. 3. Each of a plurality of slats 50 is coupled to and extends between opposing ends 52 of the frame 48.

Each of a set of feet 54 is coupled to and extends from the frame 48 proximate to a respective corner 56 of the frame 48. The feet 54 are positioned to extend between the frame 48 and the top 24 of the second housing 16 to position the first grate 44 above the set of burners 46.

A plurality of orifices 58 is positioned through the top 24 of the second housing 16. The orifices 58 are configured to permit drippings from the food item to flow into the interior space 18. The plurality of orifices 58 comprises six orifices 58 that are positioned three-apiece proximate to opposing sides 60 of the top 24.

A plurality of slots 62 is positioned through a front 64 of the second housing 16. The slots 62 are positioned proximate to the upper end 20 of the first housing 12. The plurality of slots 62 comprises two slots 62. Each of a plurality of trays 66 is selectively insertable through a respective slot 62 into the interior space 18, as shown in FIG. 3, to position the tray 66 to collect the drippings that enter the interior space 18 through the orifices 58.

Each tray 66 comprises a first panel 68 and a first wall 70. The first panel 68 is rectangularly shaped. The first wall 70 is coupled to and extends substantially perpendicularly from a first perimeter 72 of the first panel 68. The first wall 70 retains the drippings on the first panel 68.

Each of a plurality of cutouts 74 extends from a respective slot 62 toward the top 24 of the second housing 16. The cutout 74 is positioned to insert digits of a hand of a user to remove a respective tray 66 from the interior space 18 through the respective slot 62.

Each of a plurality of second grates 76 is selectively couplable to a respective burner 22, as shown in FIG. 2. The respective burner 22 is selectively configurable to heat a respective item of cookware that is positioned on the second grate 76. The second grates 76 allow the burners 22 to be utilized with standard cookware items, such as pots, pans, and the like.

Each of a plurality of plates 78 is configured to position between a respective second grate 76 and the first grate 44, as shown in FIGS. 2 and 3. The plate 78 is configured to divert the drippings from the respective burner 22 toward the plurality of orifices 58. Diverting the drippings from the burners 22 helps to prevent flare-ups.

Figure 4:
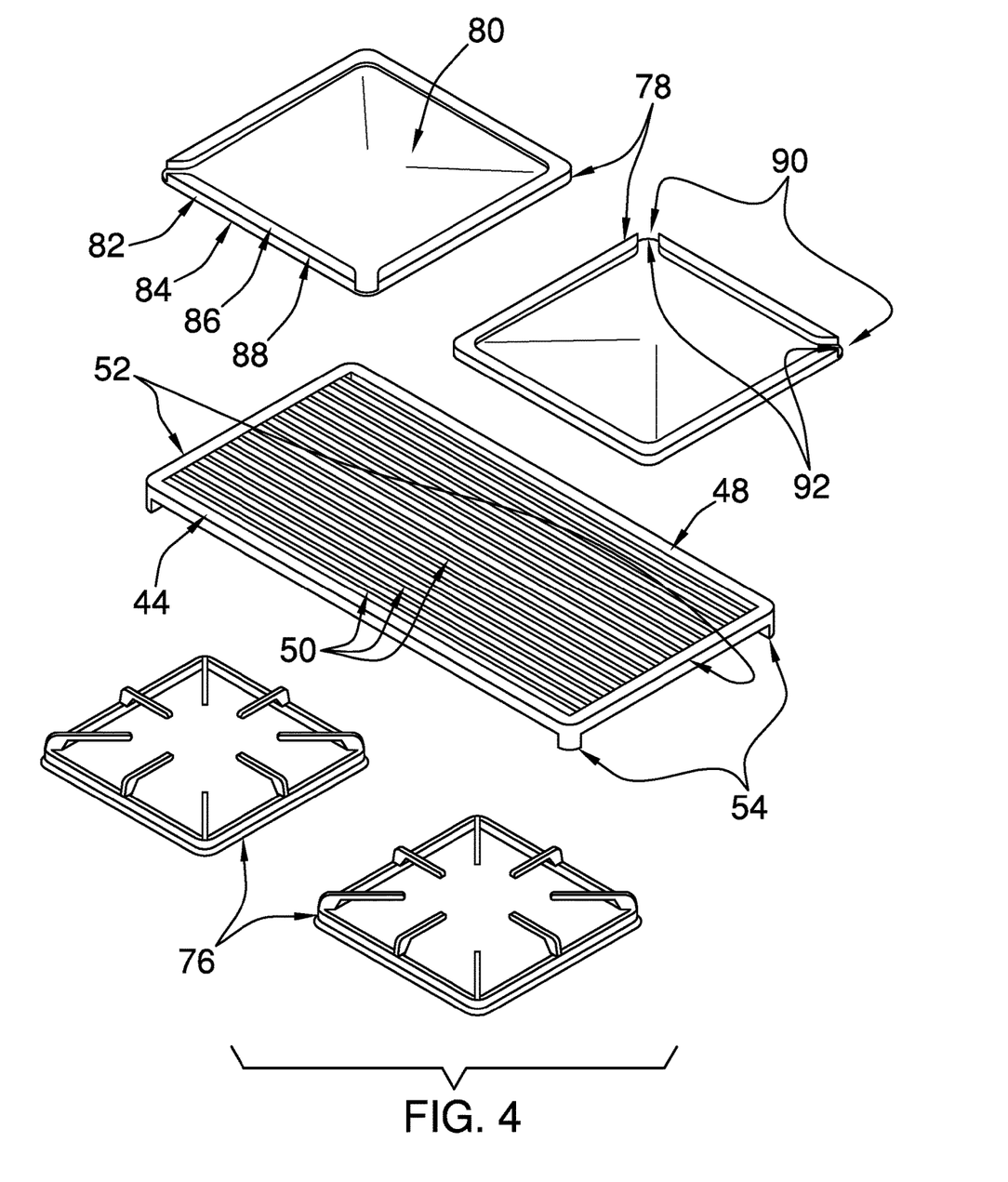
FIG. 4 is an isometric perspective view of an embodiment of the disclosure.

Each plate 78 comprises a second panel 80 that is squarely shaped. A second wall 82 is coupled to and extends substantially perpendicularly from a second perimeter 84 of the second panel 80. A third panel 86 is coupled to and extends substantially perpendicularly from a third perimeter 88 of the second wall 82. The second panel 80 and the third panel 86 extend codirectionally from the second wall 82, as shown in FIG. 4.

A pair of notches 90 is positioned singly proximate to adjacent corners 92 of the second panel 80. Each notch 90 extends through the third panel 86 and the second wall 82. The notch 90 is positionable proximate to a respective orifice 58 and is configured to direct the drippings from the second panel 80 to the respective orifice 58.

Figure 5:
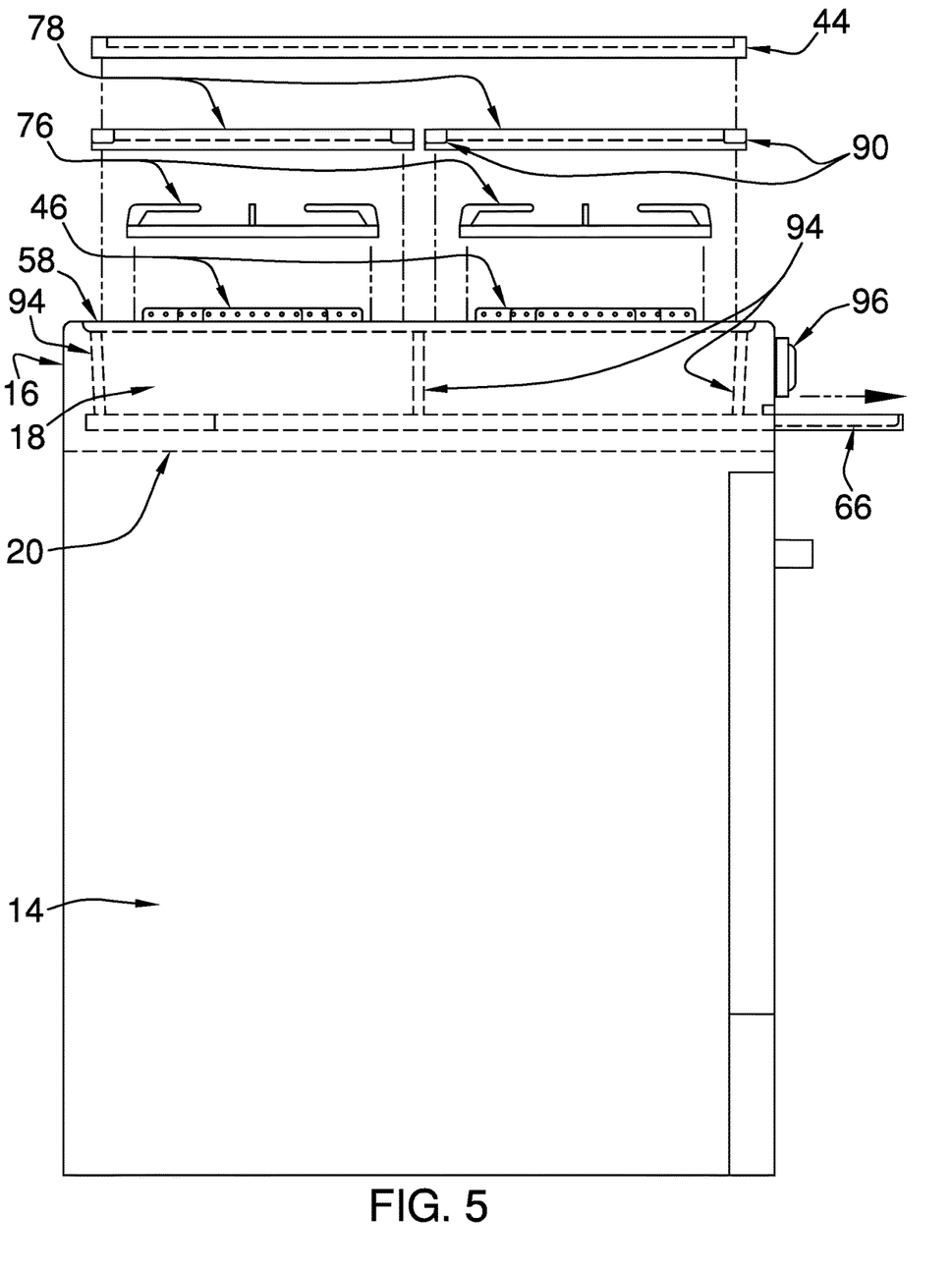
FIG. 5 is a cross-sectional view of an embodiment of the disclosure.

Each of a plurality of tubes 94 is coupled to the second housing 16 and extends from an associated orifice 58 through the interior space 18 to proximate to the upper end 20 of the first housing 12, as shown in FIG. 5. The tubes 94 are configured to direct the drippings through the interior space 18 to the respective tray 66.

A controller 96 is coupled to the second housing 16. The controller 96 is operationally coupled to the plurality of burners 22 and the gas source. The controller 96 is configured to selectively control a flow of the gas from the gas supply to the burners 22.

The controller 96 comprises a set of four knobs 98 that is coupled to the front 64 of the second housing 16. The knobs 98 are rotatable. Each knob 98 is operationally coupled to an associated burner 22 and is configured to selectively control the flow of the gas from the gas supply to the plurality of rings 26 of the associated burner 22. The user is positioned to selectively direct the flow of the gas to the inner ring 32 for a low flame, to both the inner ring 32 and the medial ring 34 for a medium flame, and to the inner ring 32, the medial ring 34, and the outer ring 30 for a high flame.

In use, the first grate 44 is positioned on the set of burners 46 so that the set of burners 46 is configured to grill the food item that is positioned on the first grate 44. The plate 78 is configured to divert the drippings from the respective burner 22 toward the plurality of orifices 58. The orifices 58 are configured to permit the drippings from the food item to flow through the tubes 94 to be collected in the tray 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stovetop cooking and grilling assembly comprising:
a first housing configured as an oven;
a second housing defining an interior space, said second housing being coupled to and extending from an upper end of said first housing;
a plurality of burners coupled to a top of said second housing, said burners being gas-fired;
a plurality of first grates, each first grate being selectively couplable to a set of said burners;
a plurality of orifices positioned through said top of said second housing;
a plurality of slots positioned through a front of said second housing;
a plurality of trays, each tray being selectively insertable through a respective said slot into said interior space;
wherein said first grate is positioned on said set of said burners such that said set of said burners is configured for grilling a food item positioned on said first grate, wherein said orifices are positioned in said second housing such that said orifices are configured for permitting drippings from the food item to flow into said interior space positioning said tray for collecting the drippings;
a plurality of second grates, each said second grate being selectively couplable to a respective said burner, wherein said second grates are positioned on said burners such that said respective said burner is selectively configurable for heating a respective item of cookware positioned on said second grate; and a plurality of plates, each said plate being configured for positioning between a respective said second grate and said first grate such that said plate is configured for diverting the drippings from said respective said burner toward said plurality of orifices.

2. The assembly of claim 1, further including said plurality of burners comprising four said burners.

3. The assembly of claim 1, further including each said burner comprising a plurality of rings, said rings being tubular, said rings being selectively fluidically couplable to a gas source, each said ring being perforated defining a set of holes positioned in said ring, wherein said set of holes is positioned in said ring such that said set of holes is configured for releasing a gas from the gas source to an area proximate to said ring.

4. The assembly of claim 3, further including said plurality of rings comprising an outer ring, an inner ring, and a medial ring positioned between said outer ring and said inner ring.

5. The assembly of claim 1, further including a recess positioned in said top defining a rim extending around a circumference of said top.

6. The assembly of claim 1, further including each said first grate comprising:
a frame, said frame being rectangularly shaped;
a plurality of slats, each said slat being coupled to and extending between opposing ends of said frame;
a set of feet, each said foot being coupled to and extending from said frame proximate to a respective corner of said frame; and
wherein said feet are positioned on said frame such that said feet are positioned for extending between said frame and said top of said second housing positioning said first grate above said set of said burners.

7. The assembly of claim 1, further including said plurality of orifices comprising six said orifices positioned three-apiece proximate to opposing sides of said top.

8. The assembly of claim 1, further including said slots being positioned proximate to said upper end of said first housing.

9. The assembly of claim 1, further including said plurality of slots comprising two said slots.

10. The assembly of claim 1, further including each said tray comprising a first panel and a first wall, said first panel being rectangularly shaped, said first wall being coupled to and extending substantially perpendicularly from a first perimeter of said first panel.

11. The assembly of claim 1, further including a plurality of cutouts, each said cutout extending from a respective said slot toward said top of said second housing such that said cutout is positioned for inserting digits of a hand of a user for removing a respective said tray from said interior space through said respective said slot.

12. The assembly of claim 1, further including each said plate comprising:
a second panel, said second panel being squarely shaped;
a second wall coupled to and extending substantially perpendicularly from a second perimeter of said second panel;
a third panel coupled to and extending substantially perpendicularly from a third perimeter of said second wall such that said second panel and said third panel extend codirectionally from said second wall; and
a pair of notches positioned singly proximate to adjacent corners of said second panel, each said notch extending through said third panel and said second wall such that said notch positionable proximate to a respective said orifice such that said notch is configured for directing the drippings from said second panel to said respective said orifice.

13. The assembly of claim 1, further including a plurality of tubes, each said tube being coupled to said second housing and extending from an associated said orifice through said interior space to proximate to said upper end of said first housing, wherein said tubes are positioned in said second housing such that said tubes are configured for directing the drippings through said interior space to said respective said tray.

14. The assembly of claim 3, further including a controller coupled to said second housing, said controller being operationally coupled to said plurality of burners and the gas source, wherein said controller is positioned on said second housing such that said controller is configured for selectively controlling a flow of the gas from the gas supply to said burners.

15. The assembly of claim 14, further including said controller comprising a set of four knobs coupled to said front of said second housing, said knobs being rotatable, each said knob being operationally coupled to an associated said burner, wherein said knobs are positioned on said second housing such that each said knob is configured for selectively controlling the flow of the gas from the gas supply to said plurality of rings of said associated said burner.

16. A stovetop cooking and grilling assembly comprising:
a first housing configured as an oven;
a second housing defining an interior space, said second housing being coupled to and extending from an upper end of said first housing;
a plurality of burners coupled to a top of said second housing, said burners being gas-fired;
a plurality of first grates, each first grate being selectively couplable to a set of said burners;
a plurality of orifices positioned through said top of said second housing;
a plurality of slots positioned through a front of said second housing;
a plurality of trays, each tray being selectively insertable through a respective said slot into said interior space;
wherein said first grate is positioned on said set of said burners such that said set of said burners is configured for grilling a food item positioned on said first grate, wherein said orifices are positioned in said second housing such that said orifices are configured for permitting drippings from the food item to flow into said interior space positioning said tray for collecting the drippings;
each said burner comprising a plurality of rings, said rings being tubular, said rings being selectively fluidically couplable to a gas source, each said ring being perforated defining a set of holes positioned in said ring, wherein said set of holes is positioned in said ring such that said set of holes is configured for releasing a gas from the gas source to an area proximate to said ring;
said plurality of rings comprising an outer ring, an inner ring, and a medial ring positioned between said outer ring and said inner ring; and
said outer ring and said medial ring being substantially squarely shaped, said inner ring being circularly shaped.

17. A stovetop cooking and grilling assembly comprising:
a first housing configured as an oven;

a second housing defining an interior space, said second housing being coupled to and extending from an upper end of said first housing;

a plurality of burners coupled to a top of said second housing, said burners being gas-fired, said plurality of burners comprising four said burners, each said burner comprising a plurality of rings, said rings being tubular, said rings being selectively fluidically couplable to a gas source, each said ring being perforated defining a set of holes positioned in said ring, wherein said set of holes is positioned in said ring such that said set of holes is configured for releasing a gas from the gas source to an area proximate to said ring, said plurality of rings comprising an outer ring, an inner ring, and a medial ring positioned between said outer ring and said inner ring, said outer ring and said medial ring being substantially squarely shaped, said inner ring being circularly shaped;

a recess positioned in said top defining a rim extending around a circumference of said top;

a plurality of first grates, each first grate being selectively couplable to a set of said burners, wherein said first grate is positioned on said set of said burners such that said set of said burners is configured for grilling a food item positioned on said first grate, each said first grate comprising:
  a frame, said frame being rectangularly shaped,
  a plurality of slats, each said slat being coupled to and extending between opposing ends of said frame, and
  a set of feet, each said foot being coupled to and extending from said frame proximate to a respective corner of said frame, wherein said feet are positioned on said frame such that said feet are positioned for extending between said frame and said top of said second housing positioning said first grate above said set of said burners;

a plurality of orifices positioned through said top of said second housing, wherein said orifices are positioned in said second housing such that said orifices are configured for permitting drippings from the food item to flow into said interior space, said plurality of orifices comprising six said orifices positioned three-apiece proximate to opposing sides of said top;

a plurality of slots positioned through a front of said second housing, said slots being positioned proximate to said upper end of said first housing, said plurality of slots comprising two said slots;

a plurality of trays, each tray being selectively insertable through a respective said slot into said interior space positioning said tray for collecting the drippings entering said interior space through said orifices, each said tray comprising a first panel and a first wall, said first panel being rectangularly shaped, said first wall being coupled to and extending substantially perpendicularly from a first perimeter of said first panel;

a plurality of cutouts, each said cutout extending from a respective said slot toward said top of said second housing such that said cutout is positioned for inserting digits of a hand of a user for removing a respective said tray from said interior space through said respective said slot;

a plurality of second grates, each said second grate being selectively couplable to a respective said burner, wherein said second grates are positioned on said burners such that said respective said burner is selectively configurable for heating a respective item of cookware positioned on said second grate;

a plurality of plates, each said plate being configured for positioning between a respective said second grate and said first grate such that said plate is configured for diverting the drippings from said respective said burner toward said plurality of orifices, each said plate comprising:
  a second panel, said second panel being squarely shaped,
  a second wall coupled to and extending substantially perpendicularly from a second perimeter of said second panel,
  a third panel coupled to and extending substantially perpendicularly from a third perimeter of said second wall such that said second panel and said third panel extend codirectionally from said second wall, and
  a pair of notches positioned singly proximate to adjacent corners of said second panel, each said notch extending through said third panel and said second wall such that said notch positionable proximate to a respective said orifice such that said notch is configured for directing the drippings from said second panel to said respective said orifice;

a plurality of tubes, each said tube being coupled to said second housing and extending from an associated said orifice through said interior space to proximate to said upper end of said first housing, wherein said tubes are positioned in said second housing such that said tubes are configured for directing the drippings through said interior space to said respective said tray;

a controller coupled to said second housing, said controller being operationally coupled to said plurality of burners and the gas source, wherein said controller is positioned on said second housing such that said controller is configured for selectively controlling a flow of the gas from the gas supply to said burners, said controller comprising a set of four knobs coupled to said front of said second housing, said knobs being rotatable, each said knob being operationally coupled to an associated said burner, wherein said knobs are positioned on said second housing such that each said knob is configured for selectively controlling the flow of the gas from the gas supply to said plurality of rings of said associated said burner; and wherein said first grate is positioned on said set of said burners such that said set of said burners is configured for grilling the food item positioned on said first grate, wherein said orifices are positioned in said second housing such that said orifices are configured for permitting the drippings from the food item to flow into said interior space positioning said tray for collecting the drippings.

* * * * *